(12) United States Patent
Brewer

(10) Patent No.: US 6,208,626 B1
(45) Date of Patent: Mar. 27, 2001

(54) REAL-TIME SATELLITE COMMUNICATION SYSTEM USING SEPARATE CONTROL AND DATA TRANSMISSION PATHS

(76) Inventor: Charles R. Brewer, 3007 Chapel Hill Rd., Stillwater, OK (US) 74074

( * ) Notice: Subject to any disclaimer, the term of this patent is extended or adjusted under 35 U.S.C. 154(b) by 0 days.

(21) Appl. No.: 09/220,540

(22) Filed: Dec. 24, 1998

(51) Int. Cl.[7] ................................................. H04B 7/212
(52) U.S. Cl. ......................... 370/324; 370/321; 370/310
(58) Field of Search ..................................... 370/310, 321, 370/324, 312, 328, 337, 503

(56) References Cited

U.S. PATENT DOCUMENTS

| | | | |
|---|---|---|---|
| 4,736,371 | * | 4/1988 | Tejima .................................. 370/236 |
| 5,072,445 | | 12/1991 | Nawata ............................... 370/104.1 |
| 5,315,589 | | 5/1994 | Kepley et al. ........................... 370/62 |
| 5,426,642 | * | 6/1995 | Tanabe ................................. 370/324 |
| 5,613,195 | * | 3/1997 | Ooi ...................................... 455/13.2 |
| 5,633,872 | * | 5/1997 | Dinkins ................................ 370/324 |
| 5,638,375 | | 6/1997 | Dettro et al. .......................... 370/324 |
| 5,790,535 | * | 8/1998 | Kou ...................................... 370/337 |
| 5,812,545 | * | 9/1998 | Liebowitz ............................. 370/337 |
| 5,854,793 | * | 12/1998 | Dinkins ................................. 370/503 |

* cited by examiner

Primary Examiner—Douglas W. Olms
Assistant Examiner—Ricardo M. Pizarro
(74) Attorney, Agent, or Firm—Sughrue, Mion, Zinn, Macpeak & Seas, PLLC

(57) ABSTRACT

A control communication method includes synchronizing a timing in a central earth station and a plurality of remote earth stations such that a predetermined control time period having a plurality of time slots is synchronized among the central earth station and the remote earth stations. The control time period is not longer than a substantially real-time response time period for the remote stations. This method further includes: initiating from a respective remote earth station, and completing, a transmission of control information through a satellite to the central earth station only during one or more of the time slots assigned to the respective remote earth station; receiving the transmission at the central earth station; and sending from the central earth station a separate transmission of data through the satellite to the remote earth station.

28 Claims, 16 Drawing Sheets

FIG. 8B

```
                                                            170
                                                               ↘ TRANSMITTED FROM
                                                                 CENTRAL REMOTE
  A      15    9    DATA TRANSFER BANDWIDTH (FROM CENTRAL)    9      0        175
          A         CHANNEL   CHANNEL   E N    AN    H AN  C   E
          A   NE  E           AN  E  E
  3      10                      XX            384 =   3
  3       5                      XX            768 =   7
  3       2                      XX             T1 =   1
                                         NOT ACTIVE =  0

A      16   10    DATA TRANSFER TYPE (FROM CENTRAL)        10      0

A A     E        C    E
         IP              1           EXAMPLE 1111133333 =
         H323            3           QTY 5 IP'S AND QTY 5 H323'S

A      17    5    DATA TRANSFER TYPE (FROM CENTRAL)         5      0

A A     E        C    E
         IP              1           EXAMPLE 11333 =
         H323            3           QTY 2 IP'S AND QTY 3 H323'S

A      18    2    DATA TRANSFER TYPE (FROM CENTRAL)         2      0

A A     E        C    E
         IP              1           EXAMPLE 33 =
         H323            3           QTY 2 H323'S

A      19    8    SLOT TRANSFER TIME ASSIGNED               8      0
  A      20    8    SLOT FREQUENCY ASSIGNED                   8      0
  A      21    8    SLOT TRANSFER TIME NOT ASSIGNED - OVERFLOW 8     0
  A      22    8    SLOT FREQUENCY NOT ASSIGNED - OVERFLOW    8      0
  A      23   16    TRANSCEIVER FREQUENCY SET FROM CENTRAL   16      0
  A      24    8    TRANSCEIVER POWER LEVEL SET FROM CENTRAL  8      0
  A      25    1    STATUS OF PREVIOUS TRANSMISSION GOOD G OR 1      1
                    RETRANSMIT R
  A      26    1    REQUEST DATA TRANSFERS ONLY TO START (1)  1      1
                    REQUEST REAL TIME EVENTS ONLY TO START (2)
                    REQUEST FOR DATA TRANSFERS AND REAL TIME
                    EVENTS ONLY TO START (3)
                                                  A1 - A26   158    135
                                               180                  182
```

FIG. 9A

TRANSMISSION AND OPERATIONAL INFORMATION - S & C ⟋150

| CA E | | E | CHA AC E | E C | N | CEN AL | E | E |
|---|---|---|---|---|---|---|---|---|
| | 155 | 160 | 165 | | | 170 | 175 | |
| A | 1 | 8 | NUMBER | | | 8 | 8 | |
| A | 2 | 16 | LOCATION ADDRESS | | | 16 | 16 | |
| A | 3 | 1 | SYSTEM STATUS - OPERATIONAL, UNDER CONSTRUCTION, TESTING, SUSPENDED (O, U, T, S) | | | 1 | 1 | |
| A | 4 | 16 | AUTHORIZATION CODE OF RECEIVER AT REMOTE | | | 16 | 0 | |
| A | 5 | 16 | AUTHORIZATION CODE OF RECEIVER AT CENTRAL | | | 0 | 16 | |
| A | 6 | 1 | SCRAMBLED DATA SCRAMBLED (1), UNSCRAMBLED (0) | | | 1 | 0 | |
| A | 7 | 16 | OPERATIONAL DATE | | | 16 | 0 | |
| A | 8 | 16 | DATE OF CONFIGURATION UPDATE MM, DD, YY, TIME (8) | | | 0 | 16 | |
| A | 9 | 16 | MAINTENANCE DATA | | | 16 | 0 | |
| A | 10 | 50 | MESSAGE TO REQUEST CHANGES IN A1 - A25 | | | 0 | 50 | |
| A | 11 | 9 | DATA TRANSFER BANDWIDTHS (FROM REMOTE) | | | 0 | 9 | |

|  | A<br>A NE E | CHANNEL | CHANNEL<br>AN E E | E N AN | H AN C E | |
|---|---|---|---|---|---|---|
| 3 | 10 | | XX | 384 = | 3 | EXAMPLE 073 |
| 3 | 5 | | XX | 768 = | 7 | SEVEN CHANNELS OF 384 KBPS |
| 3 | 2 | | XX | T1 = NOT ACTIVE = | 1 0 | |

| A | 12 | 10 | DATA TRANSFER TYPE (FROM REMOTE) AT 384 KBPS | | | 0 | 10 | |

|  | A A | E | C E | | |
|---|---|---|---|---|---|
|  | IP | | 1 | EXAMPLE 1111133333 = | |
|  | H323 | | 3 | QTY 5 IP'S AND QTY 5 H323'S | |

| A | 13 | 5 | DATA TRANSFER TYPE (FROM REMOTE) AT 768 KBPS | | | 0 | 5 | |

|  | A A | E | C E | | |
|---|---|---|---|---|---|
|  | IP | | 1 | EXAMPLE 11333 = | |
|  | H323 | | 3 | QTY 2 IP'S AND QTY 3 H323'S | |

| A | 14 | 2 | DATA TRANSFER TYPE (FROM REMOTE) AT 1.544 M/BITS | | | 0 | 2 | |

|  | A A | E | C E | | |
|---|---|---|---|---|---|
|  | IP | | 1 | EXAMPLE 33 = | |
|  | H323 | | 3 | QTY 2 H323'S | |

FIG. 9C

```
  A A  EC  N    A H──195                              TRANSMITTED FROM
                                                  170─
                         ──200                        CENTRAL   REMOTE
  384 KBPS TRANSFER                                                 175
     C    1    80   TRANSFER FREQUENCY 8 DIGITS EACH x 10    80    0
     C    2    80   TRANSFER POWER LEVEL 8 DIGITS EACH x 10  80    0
     C    3    80   TRANSFER START TIME 8 DIGITS EACH x 10   80    0
     C    4    80   TRANSFER STOP TIME 8 DIGITS EACH x 10    80    0
     C    5   120   TRANSFER FROM REMOTE STATION ID AND OR    0  120
                    WORKSTATION 12 DIGITS x 10
     C    6   120   TRANSFER TO WORKSTATION 12 DIGITS x 10  120    0
     C    7   120   TRANSFER TO TERMINAL 120 DIGITS x 10    120    0
     C    8    40   TRANSFER TO GROUP 4 DIGITS x 10           0   40
  210                                    205──C1 - C8       400  160

786 KBPS TRANSFER
     D    1    40   TRANSFER FREQUENCY 8 DIGITS x 5          40    0
     D    2    40   TRANSFER POWER LEVEL 8 DIGITS x 5        40    0
     D    3    40   TRANSFER START TIME 8 DIGITS x 5         40    0
     D    4    40   TRANSFER STOP TIME 8 DIGITS x 5          40    0
     D    5    60   TRANSFER FROM REMOTE STATION ID AND OR    0   60
                    TERMINAL OR WORKSTATION 12 DIGITS x 5
     D    6    60   TRANSFER TO WORKSTATION 12 DIGITS x 5    60    0
     D    7    60   TRANSFER TO TERMINAL 12 DIGITS x 5       60    0
     D    8    20   TRANSFER TO GROUP 4 DIGITS x 5            0   20
  220                                    215──D1 - D7       270   80

1.5 KBPS TRANSFER
     E    1    16   TRANSFER FREQUENCY 8 DIGITS x 2          16    0
     E    2    16   TRANSFER POWER LEVEL 8 DIGITS x 2        16    0
     E    3    16   TRANSFER START TIME 8 DIGITS x 2         16    0
     E    4    16   TRANSFER STOP TIME 8 DIGITS x 2          16    0
     E    5    24   TRANSFER FROM REMOTE STATION ID AND OR    0   24
                    TERMINAL OR WORKSTATION 12 DIGITS x 2
     E    6    24   TRANSFER TO WORKSTATION 12 DIGITS x 2    24    0
     E    7    24   TRANSFER TO TERMINAL 12 DIGITS x 2       24    0
     E    8     8   TRANSFER TO GROUP 4 DIGITS x 2            0    8
                                            E1 - E8         112   32

TOTALS A, B, C, D, E                   2060  602
```

|  | # OF DIGITS |
|---|---|
| CLASS A | 3 |
| CLASS B | 3 |
| CLASS C | 3 |
| IP ADDRESS WITHIN CLASS C | 3 |
| 230 | |
| TOTAL | 12 |

DEFINITION OF GROUP (4 DIGITS) ~236

GROUP 0001 - 9999

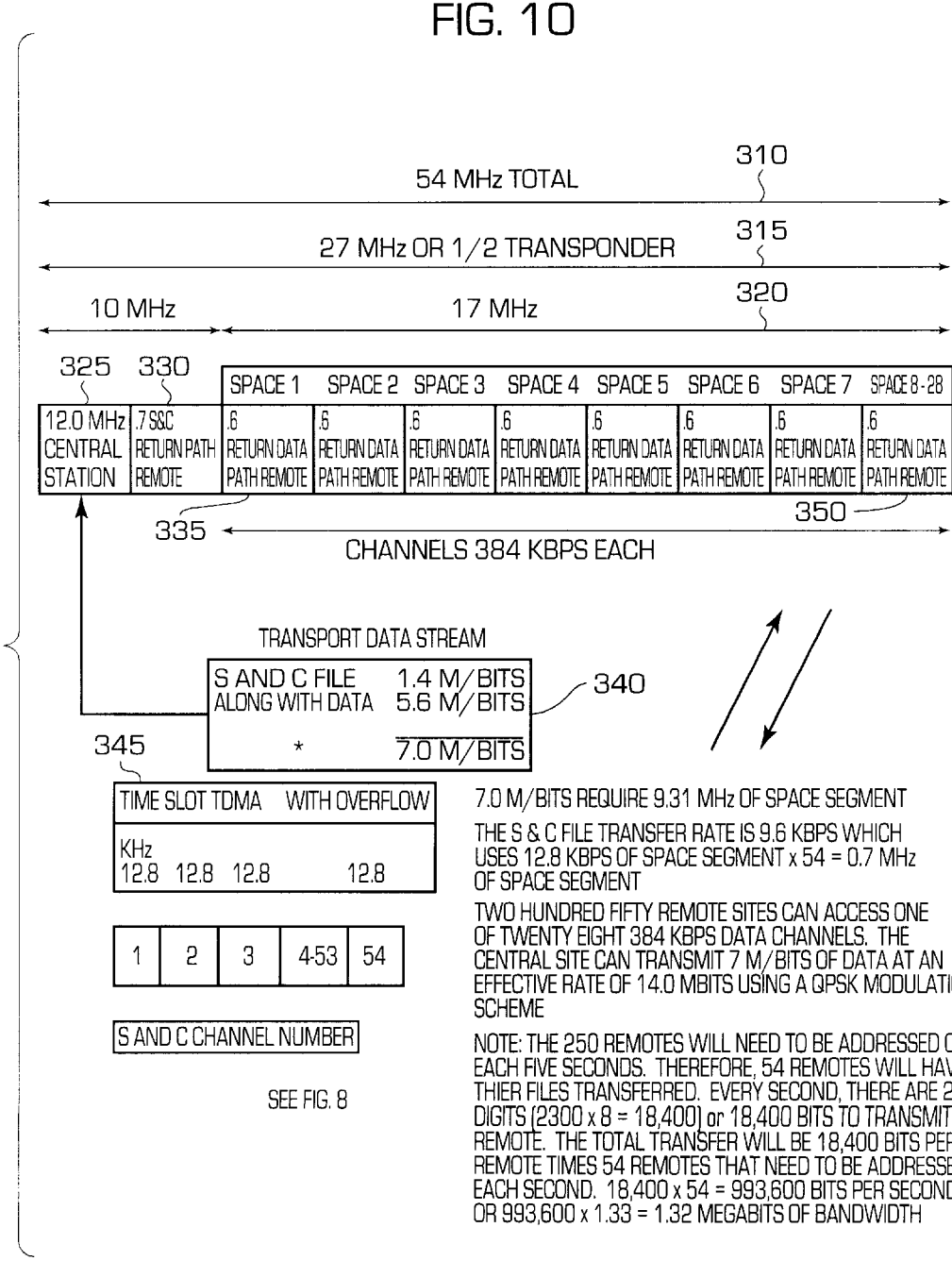

FIG. 11

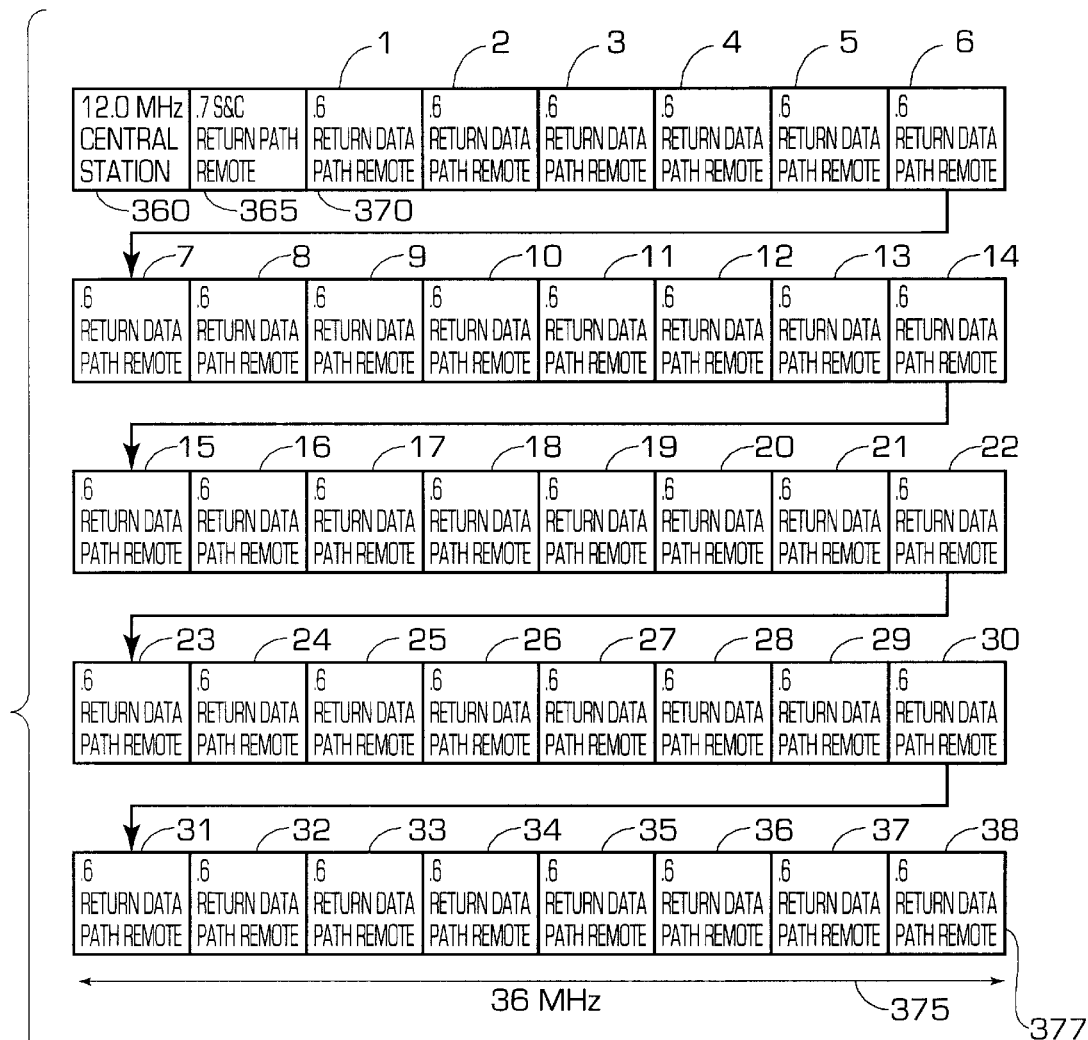

250 REMOTE SITES CAN ACCESS ONE OF THIRTY-EIGHT 384 KBPS DATA CHANNELS. *THE CENTRAL SITE CAN TRANSMIT 9.0 M/BITS OF SYNCHRONOUS AND ASYNCHRONOUS DATA WITH AN EFFECTIVE THROUGHPUT RATE OF 18 M/BITS BY USING A QPSK MODULATION SCHEME. THE .7 KBPS OF S & C FILE UPDATE REMOTE INFORMATION (SEE TIME SLOTS IN FIG. 8) WILL USE A BPSK MODULATION SCHEME. THIS IMPLEMENTATION IS BASED ON SYNCHRONOUS DATA.

REAL-TIME SATELLITE COMMUNICATION SYSTEM USING SEPARATE CONTROL AND DATA TRANSMISSION PATHS

BACKGROUND OF THE INVENTION

This invention relates generally to satellite communication systems and methods. It specifically relates to such systems and methods that enable real-time high bandwidth communications to occur between a remote location and a public access information resource, such as the Internet. This invention relates to both geostationary satellites (GEO's) and non-geostationary satellites (LEOs).

Geostationary Satellites (GEO's)

Satellite communication systems have been used as a high-speed pipeline sending many signals in one direction. These signals include various information or data such as video signals or telephone signals, typically compressed at one site and transmitted to a second site or to multiple sites and decompressed.

In satellite communication systems, a concept called Very Small Aperture Terminal (VSAT) permits multiple locations to send small packets of data to other locations via the satellite "pipelines." The predominate transmission technique uses polling, in which a ground station hub uses a satellite transmission to poll one or more remote sites for any data the remote sites have to send back to the hub. Data can be sent to the hub, analyzed and rerouted. In a polling system, a common return transmission path services both polling service requests and impending data transfers.

The VSAT polling technique entails a complex and costly hub. The technique is set up to accommodate many short bursts of return site data. The polling methodology is not conducive to provide timely responses in a consistent manner to the remote users. It also does not provide for deterministic status monitoring and control on a continuous basis of the remote terminals.

Another technique, demand assigned multiple access (DAMA), routes data between ground stations without a requirement that it be transmitted to a central hub for redistribution with a second satellite transmission. This technology is more costly to implement over a large number of remote sites than a polled architecture; however, it supports larger bandwidths. If available, a transmit channel is temporarily assigned to the remote site via a transmission from one of the other sites in the network. The channels could be assigned by the site sending the transmission or assigned from an available pool by any site in the network. Thus, the DAMA technique, as opposed to the polling technique, does not require remote transmissions to go to one central hub station for retransmission to the destination station. It has been used, for example, in offering digital phone and data service in developing countries. With this technology, routing and switching are grouped into small earth station clusters, then sent to a main earth station where they are transmitted to the end destination. Specific application dependent pieces of earth station hardware perform the phone switching.

DAMA and polled satellite communication systems often use a TDMA (Time Division Multiple Access) technique. The TDMA technique enables several remote sites to share a common channel on a transponder of the communication satellite. That is, several remote sites will each transmit a fixed length transmission in a predetermined time sequence. Each transmission will address the specific channel at a precise time.

In most VSAT systems (Polled or DAMA) a remote satellite transmission contains both data information and status and control information. Because of this, neither type of satellite communication system achieves a precise predetermined or real time deterministic satellite transmission response from a remote terminal station.

Low Earth Orbital Satellites (LEOs)

LEOs operate both as single satellites and as part of a constellation of many satellites. LEOs operate in assigned non-geostationary polar orbital slots that have a much lower altitude than GEO's. GEO's operate at an altitude of 22,300 miles above earth whereas LEOs can operate at altitudes from 375 to 1,250 miles. Like GEO's, some LEOs are planned to operate with comparable size transponders (36 MHz and 54 MHZ transponders). GEO's often have 24 transponders and LEOs often have less than one half that number. Fewer transponders provide less total satellite bandwidth.

It takes many non-geostationary LEOs operating in a polar arc above earth to fill the needs of a single geostationary earth station operating 24 hours a day. This is due to the need to have multiple LEOs because of the limited time each LEO physically has in orbit while over a specific ground station. LEOs are placed in a polar arc and operate at a fixed distance from each other. Therefore, a specific LEO satellite passing over an earth station is accessible by the earth station for a finite period of time. The earth station would therefore be dependent on communicating with many LEOs over a 24-hour period in order to maintain continuous communication. LEO earth stations addressing the low data rate mobile telephone market can use omni-directional antennas to send and receive transmissions from the satellite presently orbiting above its ground station. LEOs addressing the medium or high-speed data transfer market require the earth stations to use one or more mechanical tracking antennas. A new antenna technology referred to as a phased array antenna is being developed by others such as Motorola to reduce the cost of an earth station that communicates with LEOs.

Satellite to satellite transmissions between several LEOs orbiting in the same polar arc are performed by using a processing technique called store and forward. LEOs have an onboard microprocessor that can perform limited processing functions. The processor can analyze a special packet header on a data packet and cause the data packet to be forwarded to an adjacent satellite in the polar arc. Special packet headers contained in the front of data packets are used for routing the packets between satellites in the polar arc. Once a packet is accepted for processing by its intended remote earth station site, the packet is processed in a similar manner as a packet sent to a remote earth station site from a geostationary satellite.

A LEO can operate in a message/broadcast or Interactive mode of transmission. A message/broadcast mode sends packets to all ground station locations simultaneously (point to multipoint); an interactive mode is point to point.

Satellite to satellite transmissions occur via a Ka band or V band spectrum. Future developments may replace these links with laser communication technology. The present invention is not dependent on either type of satellite to satellite transmission technology. LEOs supporting voice, interactive multimedia and data applications usually communicate to earth stations via the Ka or V band spectrum.

LEOs are divided into three categories: Micro LEOs, Mid LEOs, and Big LEOs. The Micro, Mid and Big usually define the physical size of the satellite and its overall bandwidth capacity and the amount of earth's surface covered by its network of satellites. All three types operate within the altitude envelope above earth of 375 to 1,250 miles. If LEOs try to operate below 375 miles, they become susceptible to the earth's gravity. Most LEOs operate at an altitude of between 435 and 800 miles.

Big and Mid-size LEOs are being deployed and licensed for global communications. Micro LEOs are being deployed and licensed primarily for regional communications. Most United States Federal Communications Commission (FCC) licenses being granted are for global networks. The first global LEO satellite network to reach operational status is used to serve the mobile phone market. Medium and big LEOs are usually capable of receiving transmissions from high bandwidth transmissions (partial T1 and full T1). LEOs usually operate by using one of two techniques FDMA/ TDMA, or CDMA. LEOs operating with Frequency Division Multiple Access (FDMA) and Time Division Multiple Access (TDMA) techniques are applicable to this invention.

LEOs operating with a Code Division Multiple Access (CDMA) technique probably are not applicable to the present invention due to their lower and limited bandwidth capabilities. CDMA is a technique in which a remote earth station uses a spread spectrum modulation and orthogonal codes to avoid interfering with other remote earth stations.

None of the previous GEO/LEO techniques discussed have provided a relatively simple and inexpensive way of communicating high-speed information that has a time dependency to and from remote site locations, especially the ones in which a high bandwidth connectivity infrastructure is not available to provide the high-speed information to and from the remote locations. Thus, there is the need for an improved and new satellite communication system and transmission method to satisfy this need.

SUMMARY OF THE INVENTION

The present invention overcomes the above-noted and other shortcomings of the prior art by providing a novel and improved real-time satellite communication system using separate control and data transmission paths. It also offers a new art for future designs that require a real time predictable response satellite communication system. This includes a novel and improved control communication method for a satellite communication system, a novel and improved method of providing fast and timely information to remote locations, and a novel and improved satellite communication system providing real time critical event messaging and control with optional follow on timely transmissions of high bandwidth data, videoconferencing, or other multimedia data transfers.

The present invention provides a two-way satellite communication system that offers high-speed bandwidths to locations previously lacking high bandwidth connectivity. This invention provides real time critical message and communication system status and control processing in one dedicated transmission path. This enables immediate and continuous responsiveness to real time events or to requests for services required from remote locations, and thus enables such services as Internet, video conferencing, audio conferencing or other standards based communications to be available at remote locations.

High-speed data transfers can take place in an interactive real time environment without the bandwidth limitations of a time slot architecture. Another advantage of the present invention is that one or more synchronous data protocols can be transmitted within the same data stream. This capability enables many different types of data protocols to be combined to meet application specific requirements. Different protocols can be sent in the same data stream.

Non-limiting examples of where the present invention has particular utility include: (1) rural, or isolated, locations that do not have the connectivity infrastructure for receiving or transmitting the uncompressed and compressed data communicated through the present invention, (2) governmental service agencies that desire an alternate communication path to secure and rapidly deploy telecommunications, (3) urban and rural locations where protocol standards are not compatible with terrestrial circuits, and (4) locations with hazardous waste, chemicals or contaminants, or locations requesting constant monitoring. Widely separated sites can quickly recognize critical events and then conduct videoconferences with full-motion video and exchange data simultaneously. Interactive communication with remote locations can reduce travel time and expense for meetings, consulting or training. Companies can provide their staffs with up-to-date information to keep up with advances in their fields. Medical facilities in rural, or isolated, areas can enhance the quality of health care and limit the cost for their patients by using this invention to exchange data and to consult with other health care professionals. Patients may receive treatment on-site without the inconvenience or potential hazard of extended transport. Interactive training in a variety of fields can be provided anywhere a remote station can be located in communication with a communication satellite. Interactive distance learning courses bring education opportunities to remote areas which were previously outside of a high bandwidth connectivity infrastructure.

The foregoing advantages can be achieved with a system having a single central earth station providing a single switch for the various informational resources desired by the remote locations. This information can include a variety of high-speed data such as interactive video conferencing and a full range of multi-media capabilities available through Internet and Intranet connections.

In the present invention, each remote earth station operates with dual transmission paths to a central station. One transmission path for critical real time event and communication status and control uses fixed transmission time slots within a channel of a transponder to predetermine when a control file of information will be transmitted from a particular remote station to the central station. The other transmission path is used to transmit synchronous data between remote stations and the central station. The status and control file transmitted to the central station enables the central station to determine the second path's data transmission rates, when to begin the actual data transmission, the channel frequency assignment in which to transmit the synchronous data, the expected time duration of the transmission, and where to transmit the data.

The present invention works with either geosynchronous or nongeosynchronous satellites (e.g. GEOs or LEOs). For example, the present invention can work in either a LEO message/broadcast or interactive mode such that remote earth stations selectively respond to only those transmissions applicable to them. The present invention can be deployed with, for example, LEOs using FDMA or TDMA techniques and operate in a similar manner as applied to operating GEO satellites.

More particularly, this invention provides a control communication method for a satellite communication system having a central earth station and a plurality of remote earth stations linked to the central earth station through at least one satellite in orbit above the earth. This method comprises synchronizing the timing of the central earth station along with the plurality of remote earth stations such that a predetermined control time period having a plurality of distinct sequential time slots is synchronized among the earth station and the remote earth stations. This synchronized timing is necessary to correctly time phase the TDMA remote transmission. Preferably, the control time period is cyclical wherein each remote site has a cyclical control time. This is the time the remote site sends a status and control signal to the central earth station and receives its corresponding return transmission acknowledgement. Preferably the control time period is not longer than a substantially real-time response time period for any one of the remote earth stations. This method further comprises initiating from a respective remote earth station. The method still further comprises receiving the transmission at the central earth station and sending from the central earth station, in response to the received transmission, a separate transmission of data through the satellite to the remote earth station. This separate transmission preferably occurs such that the data is received by the respective remote earth station within the predetermined substantially real-time response time period or at least within a real-time response period relative to such separate data transmissions between the central earth station and the respective remote earth station. Synchronizing preferably includes receiving in the central earth station and the remote earth stations, a timing signal from a source other than the central earth station and the remote earth stations (e.g., a timing signal from the Global Positioning System). The method can still further comprise obtaining the data from a public access information resource containing high bandwidth digitally compressed and non-compressed information. A particular resource for non-compressed data is the Internet.

The present invention can also be defined as a method of providing information to remote locations. This comprises defining a satellite communication group having a central earth station, a plurality of remote earth stations each at a respective location remote from the central earth station, and a satellite in geosynchronous or nongeosynchronous orbit above the earth. This also includes assigning a cyclical control communication time period to the defined satellite communication group, wherein the control time period is not longer than a substantially real-time response time period for any one of the remote earth stations in the defined satellite communication group. The method further includes determining a transmission time having a duration sufficient for a transmission to be sent from any of the remote earth stations and received by the central earth station. Also included in this method is allocating a specific number of time slots within the control communication time period in response to the duration of the control communication time period and the determined transmission time. The method further comprises determining the number of remote earth stations in the defined satellite communication group and the number of time slots. The method also includes assigning each remote earth station to at least one respective time slot and to a common control transmission frequency if there are not more remote earth stations than time slots. If there are more remote earth stations than time slots and frequencies to allocate, a remote earth station is assigned to an overflow area. The overflow area is designed to allow the remote site to operate and transmit, however, the response time can exceed being serviced in the basic control time period. The method further comprises time synchronizing the central earth station and the plurality of remote earth stations such that the control communication time period is synchronized among the central earth station and the remote earth stations. The method also includes initiating from a respective remote earth station, and completing, a transmission of control information through the satellite to the central earth station only during a respective one or more of the time slots of the control communication time period assigned to the respective remote earth station. The method further includes receiving the transmission at the central earth station and sending from the central earth station, in response to the received transmission, a separate transmission of data through the satellite to the remote earth station.

The present invention also provides a satellite communication system providing real-time acquisition and transmission of high bandwidth data. This system comprises: an information resource providing a high bandwidth transmission (e.g., alphanumeric information, video, audio), a satellite, and a central earth station. It also includes a remote earth station in communication with the central earth station through the satellite to transmit control information on a first transmission path through the satellite only during the predetermined periodic time slot assigned to the remote earth station. In this system the central earth station is connected to the information resource to receive the high bandwidth transmission and to communicate the high bandwidth transmission on a different transmission path through the satellite to the remote earth station in response to the control information transmitted by the remote earth station. The return data path from the remote earth station to the central earth station is on a second transmission path as distinguished from the first transmission path on which the control information is sent.

Therefore, from the foregoing, it is a general object of the present invention to provide a novel and improved real-time satellite communication system and method using separate control and data transmission paths. Other and further objects, features and advantages of the present invention will be readily apparent to those skilled in the art when the following description of the preferred embodiments is read in conjunction with the accompanying drawings.

BRIEF DESCRIPTION OF THE DRAWINGS

FIGS. 8A and 8B are a schematic and map of the time slot architecture and allocation for a remote earth station implementation of the present invention for GEO and LEO satellites.

FIG. 10 is a block diagram of the allocated space segment of an implementation of the present invention for use with a GEO satellite.

FIG. 11 is a block diagram of the allocated space segment of an implementation of the present invention for use with a LEO satellite.

DETAILED DESCRIPTION OF THE INVENTION

A Description of FIGS. 1–11

A detailed description of the satellite system of the present invention and its implementation are supported by FIGS. 1–11. FIGS. 1–5 are block diagrams and schematics of the present invention and FIGS. 6–9 are block diagrams and data schematics of an implementation of the present invention on a GEO or LEO satellite. FIGS. 10–11 are block diagrams of an implementation of the present invention and are specific to a GEO satellite or a LEO satellite.

The Satellite Communication System of the Present Invention

Figure 1:
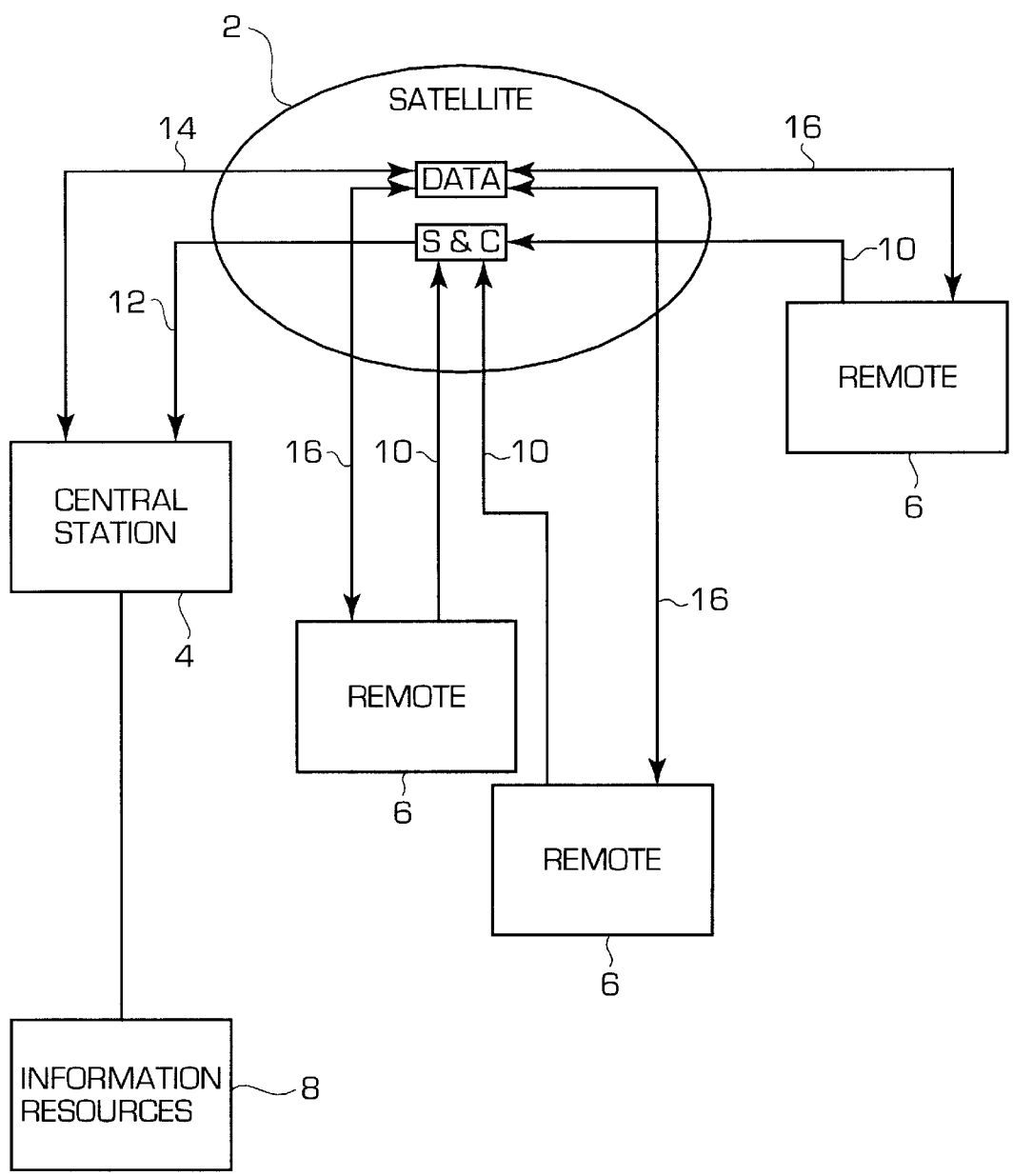
FIG. 1 is a block diagram of a satellite communication system of the present invention.

Referring to FIG. 1, the satellite communication system of the present invention includes a satellite 2 which provides transmission paths between a central earth station 4 and one or more remote earth stations 6. It is a particular aspect of the system of the present invention that the central earth station 4 is connected to one or more information resources 8. A particularly useful application of the present invention is where high bandwidth information resources 8 are required and not otherwise available at the remote locations 6.

An example of high bandwidth information resources for which the present invention is particularly adapted include Internet communications, video communications (e.g., video conferencing), audio communication (e.g., audio conferencing), and data transmissions. Typically these types of resources are packet based and require high bit-per-second transmission rates (e.g., 100's of kilobits per second and higher), especially when real-time data and/or video communications are to be provided.

Thus, the satellite communication system of the present invention provides high-speed Internet access, video conferencing and multimedia capabilities, multiple voice packets and data transmissions, for example, anywhere a remote earth station 6 can be set up in communication with a communications satellite 2. In particular, the present invention provides continuous interactive Internet access and compressed digital two-way video, audio and data transfers in real time to users in business, industry, government, health care, and education. For example, an instructor and/or student in a remote area lacking high bandwidth connectivity can conduct either an interactive on line data exchange or an interactive videoconference with an instructor in another remote area lacking high bandwidth connectivity or in an urban area with network connectivity already established.

A significant aspect of the present invention enabling this real time data and video conferencing to occur is that it utilizes two principal transmission paths. One is a dedicated status and control path, and the other is a data transmission path. The remote earth stations 6 use the dedicated status and control path to inform the central earth station 4 that the remote earth station needs something. Both the central earth station 4 and the remote earth stations 6 use the data transmission path for the high-speed data transmissions for the information from the resources 8 and for corresponding transmissions from the remote earth station (e.g., interactive videoconferencing). In FIG. 1, the uplink paths from each of the remote earth stations 6 for the dedicated status and control transmission path are designated by the reference numeral 10, and the corresponding downlink to the central station 4 is indicated by the reference numeral 12. The high-speed data transmission paths between the central earth station 4 and the satellite 2 is designated by the line 14, and the corresponding link between the satellite 2 and each remote earth station 6 is designated by the reference numeral 16. The use of these transmission paths will be described in more detail after the following explanation of the satellite 2, central earth station 4, and remote earth stations 6, status and control transmission path 10, transmission paths from the central earth station 14, and synchronization.

Implementation of the Present Invention

The implementation of the present invention implies that the allocated satellite space segment in FIGS. 10 and 11 is available for this implementation on a 24 hour day, 7 days a week, as a lease or purchase.

The implementation of this invention for the central earth station (FIG. 6) is based on available SCPC MPEG 2 uplink control equipment 110. This SCPC MPEG 2 equipment includes the packet multiplexer which outputs a data stream. The status and control processor with real time event message processing 112 as implemented in this invention includes this invention's software, programming logic, file structures, and design logic to provide the inputs in real time to the central earth stations packet multiplexer 110.

The implementation of this invention for the remote earth station (FIG. 7) is based on available hardware components that are integrated into a complete uplink system by this invention. The status and control workstation 58 provides a complete uplink system via this invention's control logic, programming files, data layouts, timing, synchronization, data transmission paths, and S & C transmission paths. Therefore, the implementation of the present invention establishes a complete operating uplink earth station at each remote site capable of receiving and transmitting IP (Internet) data, being able to conduct a video conference and processing real time events.

The implementation of the present invention has defined the size of the satellite communication system to include one central earth station, 250 remote earth stations with a provision to add 20+ additional remote earth stations. Each remote earth station can process ten 384 KBPS signals, five 768 KBPS signals, and two 1.544 M/Bit signals. The satellite space segment leased or purchased on a GEO satellite is ½ of 54 MHZ transponder or 27 MHZ. The satellite space segment leased or purchased on each LEO satellite in this polar arc or constellation is a full 36 MHZ transponder. The implementation on a LEO satellite will lease or purchase the same transponder on each satellite in the polar arc or constellation of LEO satellites. The present invention does not restrict or limit the number of transponders, the number of remote earth stations, the type of data or the data speed to be transferred. The present invention's implementation as shown in FIGS. 6–11 will be described in the following sections; satellite, central earth station, remote earth station, status and control transmission path and transmission paths from the central earth station.

Satellite

A geosynchronous or nongeosynchronous communication satellite can implement the satellite 2. Such a geosynchronous satellite has conventional transponders known in the art to operate in one or more frequency bands to which the satellite has been assigned by the Federal Communications Commission (e.g., C band, Ka band, Ku band, S band, X band, or hybrids). Such a nongeosynchronous satellite has store and forward capability and transponders that typically operate in Ka band, V band or C band. Any suitable satellite can be used so long as it provides the necessary transmission paths, bandwidths and supports a TDMA architecture. LEOs that are designed to rely on a line of site to earth station and operate on a multiple frequency or a multiple cell basis (FDMA) and use a Time Division Multiple Access (TDMA) are applicable to this invention. The usage of multiple frequencies, and/or multiple cells enables the allocated FCC frequency spectrum to be divided for status and control satellite transmissions. LEOs transmitting higher speed data and operating at Ka band or V band and requiring a clear line of site from the satellite to the earth station antenna are applicable to this invention. LEOs that only operate at lower speeds (2.4–4.8 KBPS) sent over UHF or VHF antennas that do not require a clear line of site between the satellite and the earth station are not applicable to this invention.

This invention is applicable to LEOs that have enough bandwidth to support high-speed data transfers, are line of site oriented, and also operate with a FDMA/TDMA technique. LEOs that offer a combination of phone and data or data only with a FDMA and/or TDMA mode of operation are also applicable to this invention. This invention can coexist with an existing LEO network or it can become inherent in the design logic of a new LEO satellite network. LEOs or GEOs (defined as applicable to this invention) are not inherently designed for nor are they operationally capable of processing critical real time events in a truly deterministic manner. The invention dedicates resources for status and control by assigning a fixed time slot for each remote terminal station. This assures that within a five second interval, or other predetermined period, a satellite communication system will recognize and process the time critical event. Once a central earth station is aware that a critical situation exists, it can control the transmission of the data and/or the compressed digital video exchange process on a separate data path.

The operation of the satellite 2 within the present invention is in its conventional manner of receiving uplink transmissions from earth stations and retransmitting the signal for reception to earth stations. The satellite must accommodate digital transmissions. As in the case of geosynchronous satellites, a transponder could be split between one third or one half analog and the remainder digital. Non geosynchronous satellites are typically designed for digital only transmissions.

An implementation of a channel map for this invention is represented by FIGS. 10 and 11. In this implementation, satellite transponder space segment is allocated on two different size transponders. A GEO satellite is based on a 54 MHZ transponder 310 (FIG. 10) and a LEO, a 36 MHZ transponder 375 (FIG. 11).

Information or data is transmitted to the satellite in kilobytes per second (KBPS) or megabits per second (MBPS). The transponder, however, allocates space segment in megahertz. It is therefore necessary to convert from kilobits and megabits to megahertz. This conversion is performed in establishing the size of the transport data stream 340 (FIG. 10). The status and control (S & C) return remote path 330 was converted in FIG. 8 (292). The remote return data path 335 conversion calculation is not shown, therefore, the conversion to required is 384 KBPS×1.33= 0.511 KHZ or 0.6 KHZ.

FIG. 10 requires 17 MHZ of space segment 320 to accommodate the central station 325, the S & C return path 330 and twenty-eight channels of 384 KBPS each 335 and 350. The 17 MHZ of a transponder 315 is ½ of the entire transponder of 54 MHZ 370. The S & C remote return path of 0.7 MHZ comprises both permanently assigned time slot TDMAs and their respective non-permanently assigned overflow area 345.

FIG. 11 requires the entire transponder of 36 MHZ 325. Within the 36 MHZ, of transponder, the central station requires 12.0 MHZ 360, the S & C return path 0.7 MHZ 365, and the return data path for a 384 KBPS of data to be transferred each or 23.3 MHZ to transfer 38 separate data transfers of 384 KBPS each, 377.

Central Earth Station

Figure 2:
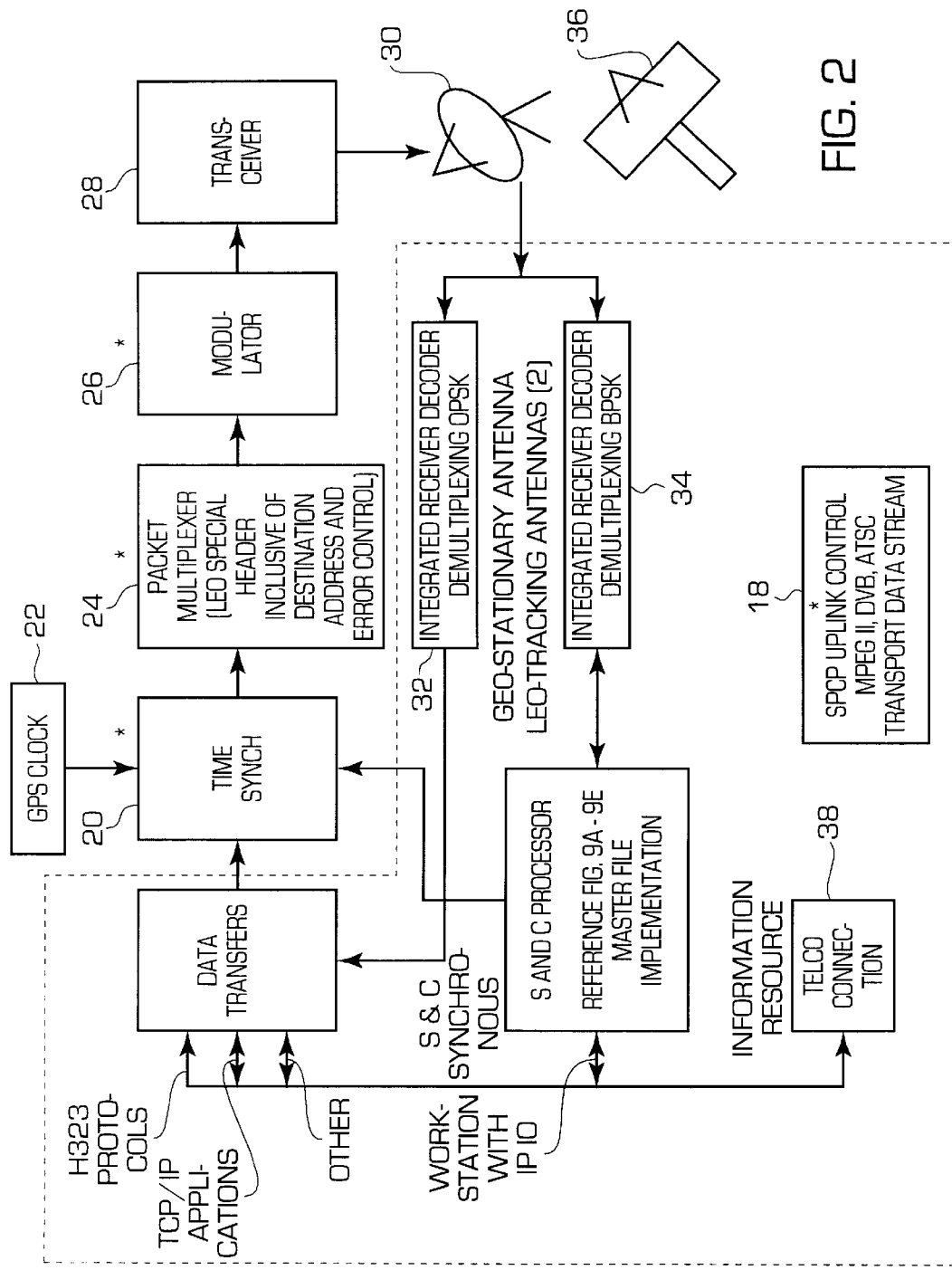
FIG. 2 is a schematic and block diagram of a central earth station of the present invention for use with a GEO or LEO satellite.

Referring to FIG. 2, the central earth station 4 includes information input and processing circuitry 18. The circuitry 18 connects to the information resources 8 in any suitable manner. For example, connection can be by copper or optical fiber cable, which can be supplied by a telephone communication service provider 38. This connection at a central earth station site can be to a DS3 line, a T1 line, an ATM line or an ISDN line. Further packets of data protocols are removed and inserted into the interconnecting earth station equipment by a router or gateway.

The information to be transmitted by the central earth station 4 over the data transmission uplink 14 is provided to a time sync circuit 20 and to a packet multiplexer 24.

The time sync circuit 20 is synchronized in the illustrated embodiment by the atomic clock from the government operated Global Positioning System (GPS) as designated by the reference numeral 22 in FIG. 2. A commercial, off the shelf, GPS receiver with antenna is used at each central or remote site to provide an actual precise coordinated time.

Non-geosynchronous satellites have an embedded level of header protocol processing in the satellite that is not found in geosynchronous satellites. To communicate with the non-geosynchronous satellites requires a header protocol applied in the packet multiplexer 24 preceding each multi-plexed packet. This header format is the same for all LEO transponders that have the same transponder number. As it relates to this invention, header format can be used to send a common message to all remote earth stations in the polar arc or send data to only one remote earth station. This message feature will be used by the central earth station of the invention to transfer a transport data stream 14 to all remote earth stations 6 simultaneously.

The ability of the header to identify and to transmit data to a specific location will be used by the remote earth station of this invention to transfer to both the primary S & C path and the secondary data path to the central earth station 4.

The output from the packet multiplexer 24 with or without the packet header 24 is input to a modulator 26. The modulator 26 takes the data stream input from the packet multiplexer 24 and through a technique referred to as phase shift keying creates a modulated signal with forward error correction. There are different modulation techniques, some of which are more power efficient. The most common types of modulation are BPSK and QPSK. Modulated signals use forward error corrections that can be ⁵/₁₁, ½, ⅗, ⅔, ¾, ⅘, ⅚ and ⅞. Some of the modulation schemes are BPSK, quadrative phase shift keying or (QPSK), DEBPSK or Differential Encoding Modulation, OKQPSK Quadraphase Modulation, DBPSK or Differential Phase Modulation. The most common LEO or GEO modulation scheme for high-speed data is QPSK with ¾ forward error correction.

The output from the modulation circuit 26 is provided to a transceiver 28. The transceiver 28 transmits the amplified signal to an input port of a feed assembly of a satellite antenna 30. GEOs and LEOs use one of three different types of feed horns to transmit and receive: prime focus, offset or gregorian type. The feed horn transmits the amplified signal of the transceiver 28 to the reflector 30, which in turn sends the amplified signal to the satellite 36 (corresponding to satellite 2 in FIG. 1). Larger earth station antenna reflectors 30 create more signal gain and therefore require less signal power from the transceiver 28 to reach the satellite 36.

In a particular embodiment the antenna reflector size for a typical GEO system is 3.7 meters at the central site and 1.8 meters or 2.4 meters at the remote site. The antenna reflector size for a LEO system depends on the particular technology. At a specific site, an antenna typically is one of two types: either a phased array antenna (re "under development") or a mechanical antenna. Both types of antennas track the LEO satellite. The phased array antenna tracks each satellite by using microelectronics that follow the satellite as it moves through the polar arc. The actual tracking electronic mechanism can be accomplished through patched arrays. The antenna size is targeted to be less than 0.7 meter by 0.7 meter. Mechanical antennas are based on existing technology. Two antennas with polar arc tracking capabilities track both the leading satellite and the trailing satellite as they travel through the arc. Mechanical antenna sizes in a particular implementation typically range from one to two meters for central earth station antenna 30 and <1 meter for remote earth station antenna 50.

The central earth station 4 can also receive signals from the remote stations. This is accomplished by integrated receiver decoders 32,34 that will take either the status and control signal or the data signal from a remote station 6. One integrated receiver decoder is required to process the control signal with BPSK modulation 34 and one integrated receiver decoder is required to process the data signal with QPSK modulation 32 Satellite receivers demultiplex the modulated signals.

Figure 6:
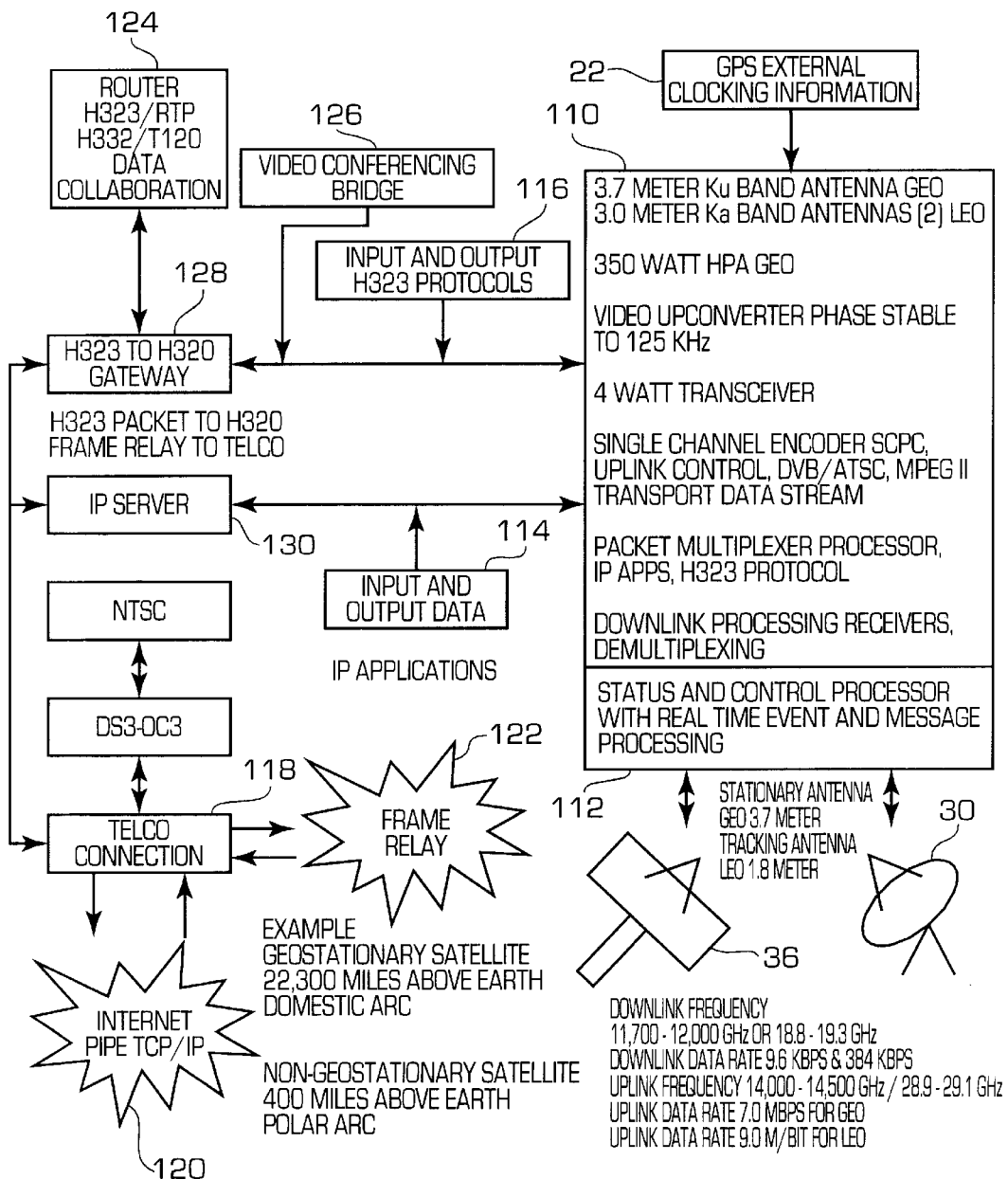
FIG. 6 is a block diagram and schematic of a central earth station of an implementation of the present invention for use with a GEO or LEO satellite.
Figure 7:
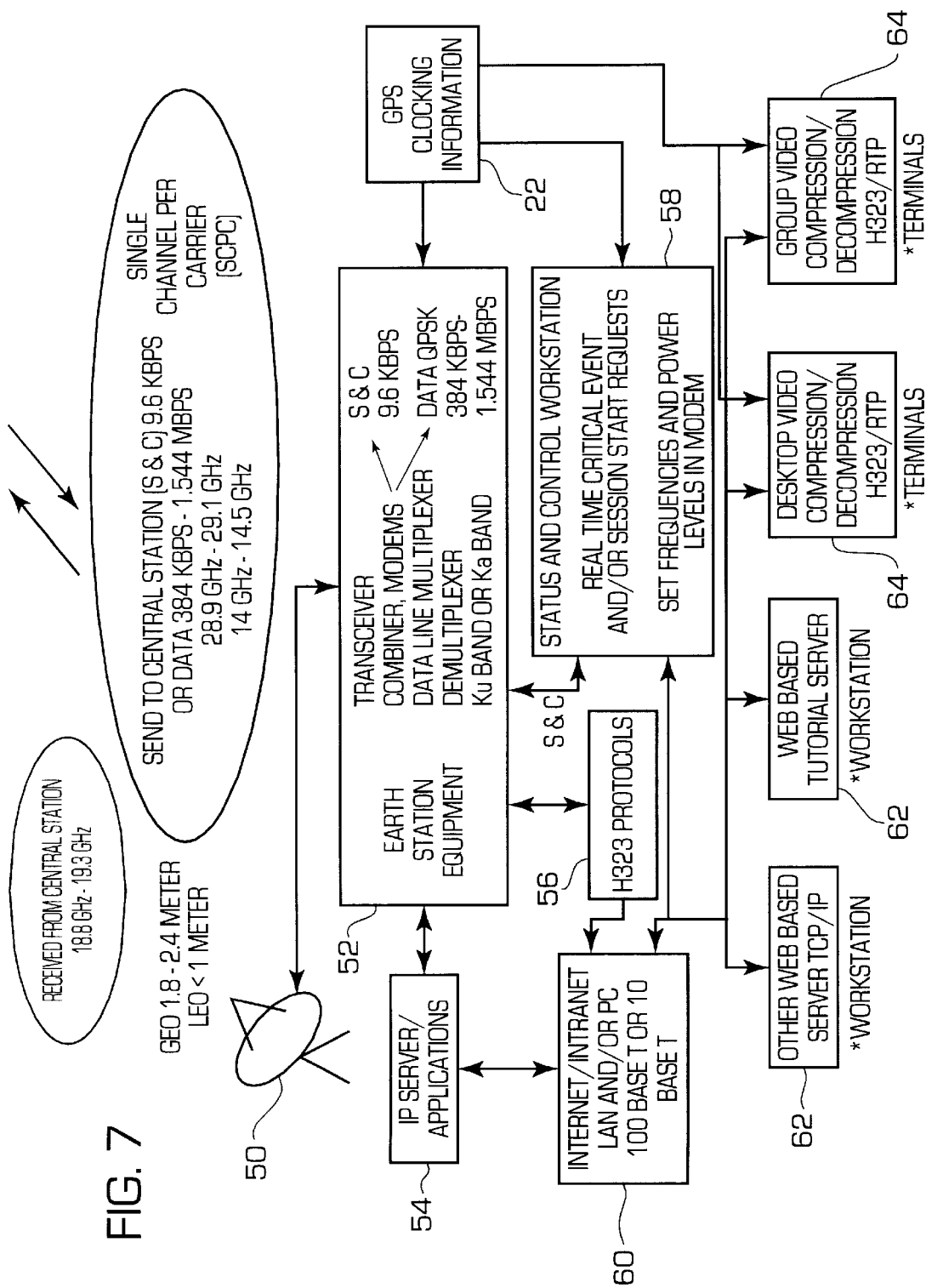
FIG. 7 is a block diagram and schematic of a remote earth station of an implementation of the present invention for use with a GEO or LEO satellite.

A particular implementation of the central earth station 4 is shown in FIG. 6. This illustrates an FCC-licensed central earth station 4 in a particular location, such as to connect to a Telco 118 providing access to the information resource(s) 8. This central earth station 4 can communicate such resources to remote earth stations 6 located anywhere within the footprint of the particular satellite or satellites 2 with which the particular central earth station 4 communicates. In this particular implementation, compressed digital media (H323) 116 and Internet Protocol (IP) applications 114 can be communicated. These resources can be obtained by connecting the central earth station 4 to the local telecommunications carrier (Telco) 118. This can be by way of a copper connection or by a high bandwidth fiber connection or other suitable means. The Telco 118 provides the IP 130 connectivity to the world wide web 120 or in the case of H323 video 116 through a gateway (H323/H320) 128 to an ISDN connection (frame relay) 122. IP 114 or H323 116 traffic from other remote earth stations can also be received and rerouted 124, 130. Telco communications are two-way so that communications can be provided back to the information resources 8 (e.g., a responsive e-mail on the Internet IP; return video and audio in a two-way video conference H323).

In the particular implementation illustrated in FIG. 6, a satellite transponder 36 is leased or assigned for use by the central earth station 4 on a seven-day, 24-hour basis. In the United States, a single carrier license from the FCC is sufficient for this. This allows the uplinking of one channel of multiplexed data to the leased transponder on the satellite on a single carrier during a single transmission 110. The uplink and downlink frequencies of either the central or the remote sites can be altered by the central site as long as they are within the designated segment of a leased or assigned transponder 36.

Remote Earth Stations

Figure 3:
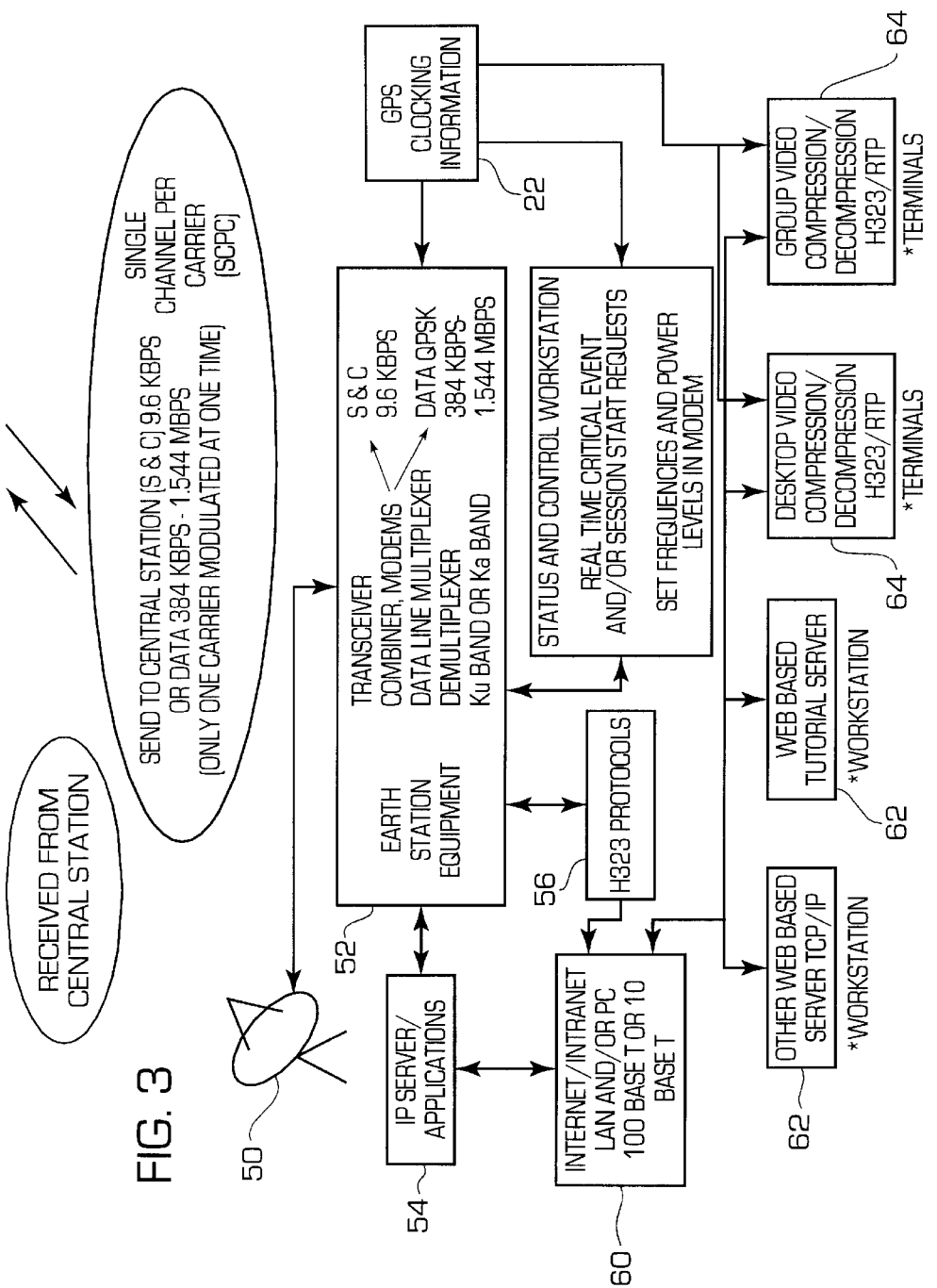
FIG. 3 is a schematic and block diagram of a remote earth station of the present invention for use with a GEO or LEO satellite.
Figure 4:
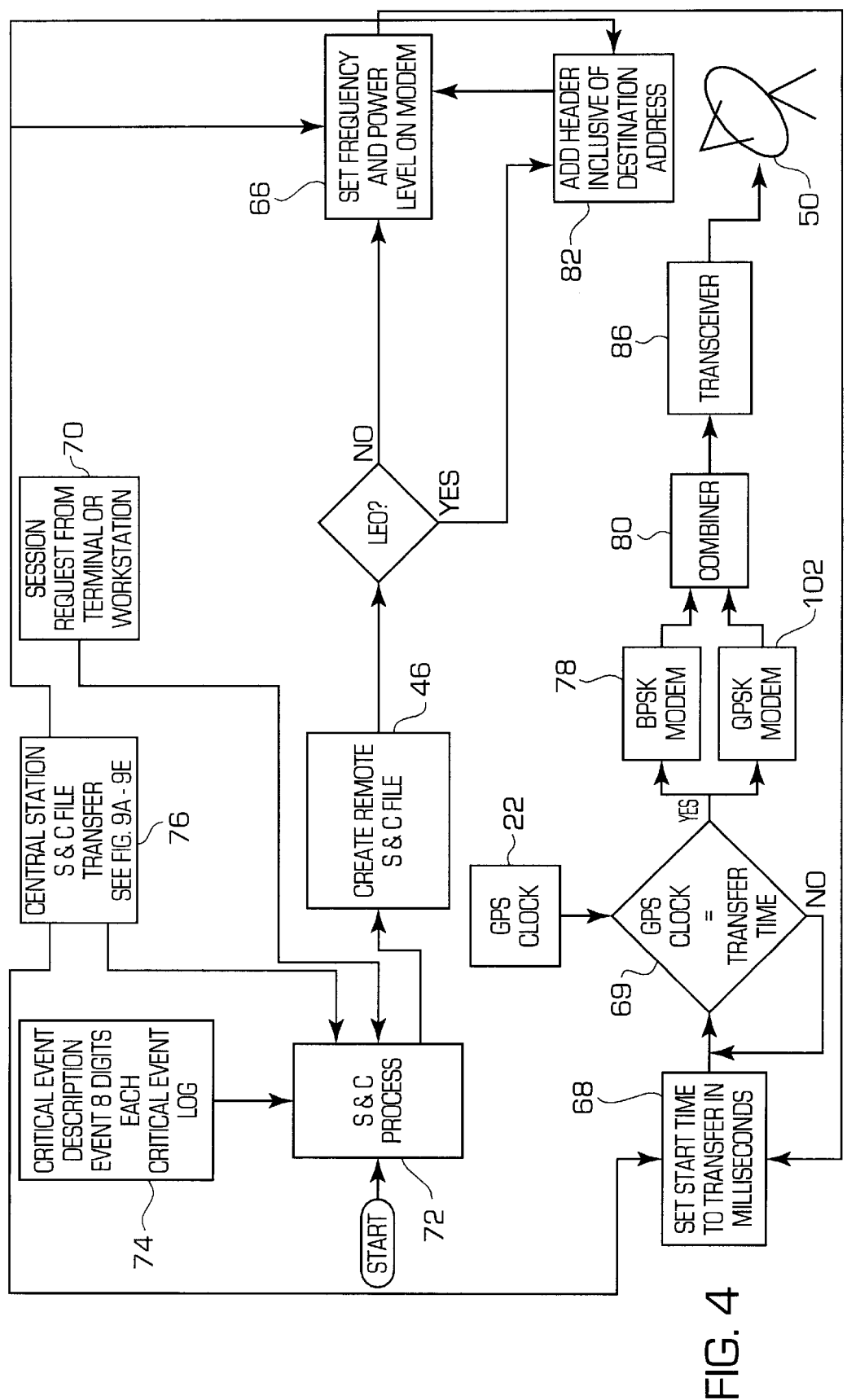
FIG. 4 is a block diagram and schematic of the primary path of status and control information of a remote earth station of the present invention for use with a GEO or LEO satellite.
Figure 5:
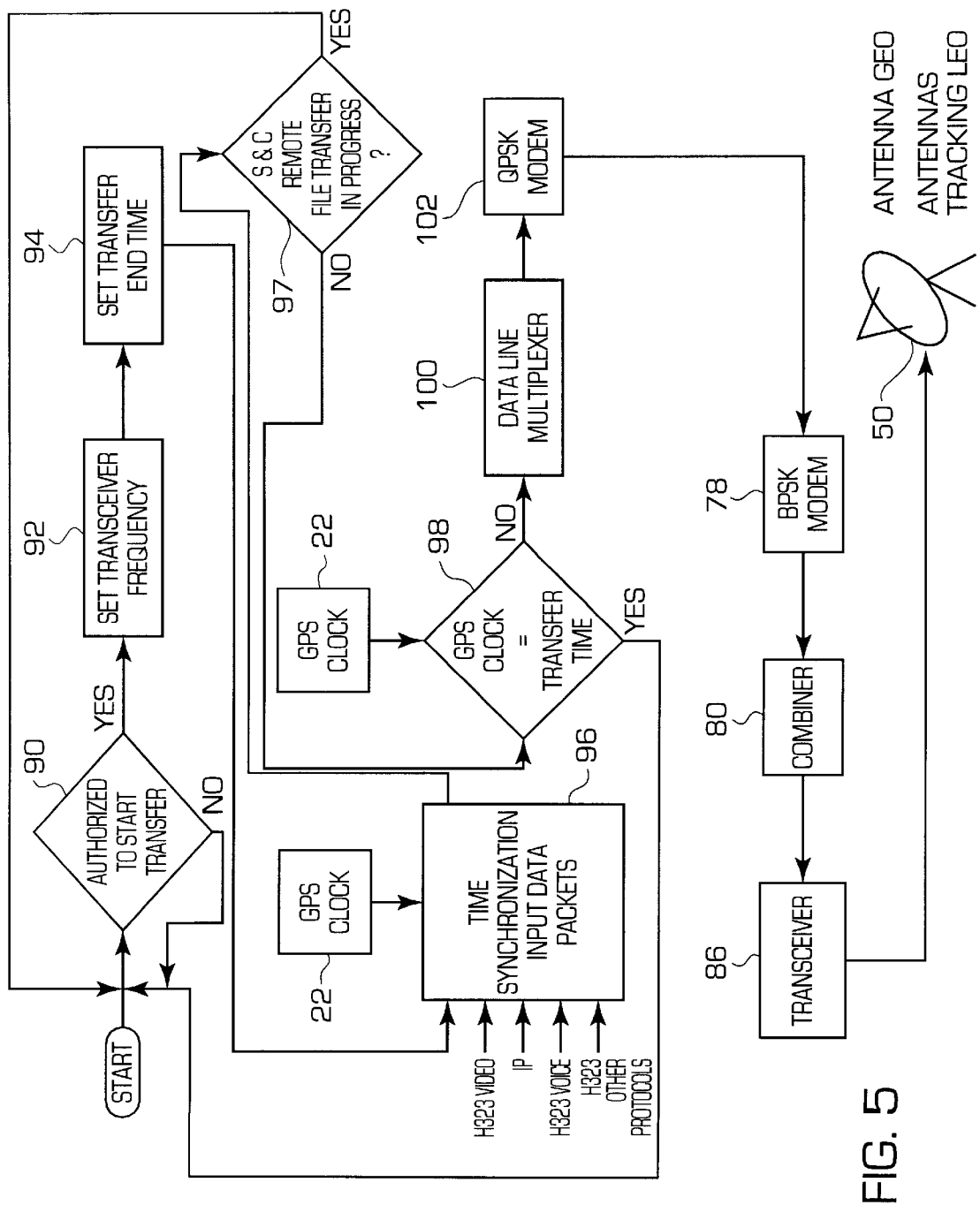
FIG. 5 is a block diagram and schematic of the secondary path of a remote earth station of the present invention for use with a GEO or LEO satellite.

Referring to FIGS. 3, 4, 5 each remote earth station 6 includes conventional equipment such as either two tracking antennas (LEO) 50 or a stationary antenna (GEO) 50 communicating with the satellite 2 (36 in FIG. 2) and circuitry 52 such as containing a transceiver, and two modems. One modem 78 operates at an input data rate of 9.6 kilobits per second and uses a BPSK modulation scheme and a second modem 102 operates at rates of 384 KBPS, 768 KBPS and 1.544 Mbytes per second. The modem 102 operates with a QPSK modulation scheme. The modem 102 accepts variable data rates, but only operates with one data rate during a single transmission at a time. The output of the modems are combined 80 before entering the transceiver 86. The transceiver outputs two separate modulated carriers.

The status and control workstation 58 determines the frequency and power level of the transceiver 86. The transceiver frequency and power can be adjusted up or down by the output of the modem 66. By varying the output of the 70 MHZ signal from the modem 66 the transceiver's frequency can be adjusted up or down. By varying the IF signal from the modem the power level in the transceiver 86 can be adjusted. The S & C remote workstation 58 sequences the S & C transmission with the data transmission so that both modulated carriers will not overlap. The remote station 6 is designed to only put up one carrier at a time and therefore not violate the FCC license. Since the S & C signal is deterministic and must transfer at a predetermined time, it has transmission priority over the data transfer. The S & C carrier is up for one second or less. This has a minimum effect on data transfer capability.

This equipment can communicate with an Internet server 54 that connects to a local area network 60 and/or a personal computer 62 such as at a classroom in a school, for example. The equipment 52 can also communicate such as with video conferencing equipment 64 that might also be provided in the classroom.

Equipment in the remote earth station 6 that is provided by or modified by the present invention is the status and control logic in the workstation 58. The logic, as shown in an implementation of the invention, operates on information contained in FIG. 9. FIG. 9 is a totally self contained file providing all the information necessary at each remote site to define the processing necessary by the S & C workstation 58.

The remote earth station 6 uses two transmission paths. It uses the status and control path by initiating transmissions out through the antenna 50 for uplink to the satellite 2 and then downlink to the central earth station 4. The remote earth station 6 also handles two-way communications through the return data transmission path which also occurs through the antenna 50. Each of these will next be described.

Status and Control Transmission Path

The status and control transmission path is dedicated solely for the communication of a respective status and control file as implemented (FIGS. 9A–9E) from each of the remote earth stations 6. A maximum time period is defined within which all of the remote earth stations 6 must complete their status and control communications. Furthermore, each communication must be initiated and completed within a respective time slot of the overall response time period.

The overall total time period is defined as the maximum duration based on the criticality of the particular application to which the present invention is being applied. For example, if a particular system is installed to provide communications with hospitals, each remote earth station must be able to provide its status and control information to the central earth station within a very short period of time. Other applications requiring real time or substantially real time communication must also have short time periods. An implementation of this invention, FIG. 8 defines the time period as a maximum of five seconds. The five second maximum was only selected as a reasonable limitation. Although all the communications need to occur within this implemented time period, the time period is cyclical in that such communication availability recurs every five seconds.

To accommodate many remote earth stations, the present invention permits transmissions to occur on different frequency channels or sub-channels within the overall dedicated bandwidth. For example, one remote earth station would be assigned to one of five implemented slots having a predetermined transmission frequency. Another five remote earth stations 6 would be assigned to the same five time slots, but these transmissions would occur at a different transmission frequency within another sub-channel bandwidth. This can be continued for additional remote earth stations up to the maximum allowed bandwidth for the dedicated status and control transmission space segment assignment allocated for permanent allocation.

Figure 8A:
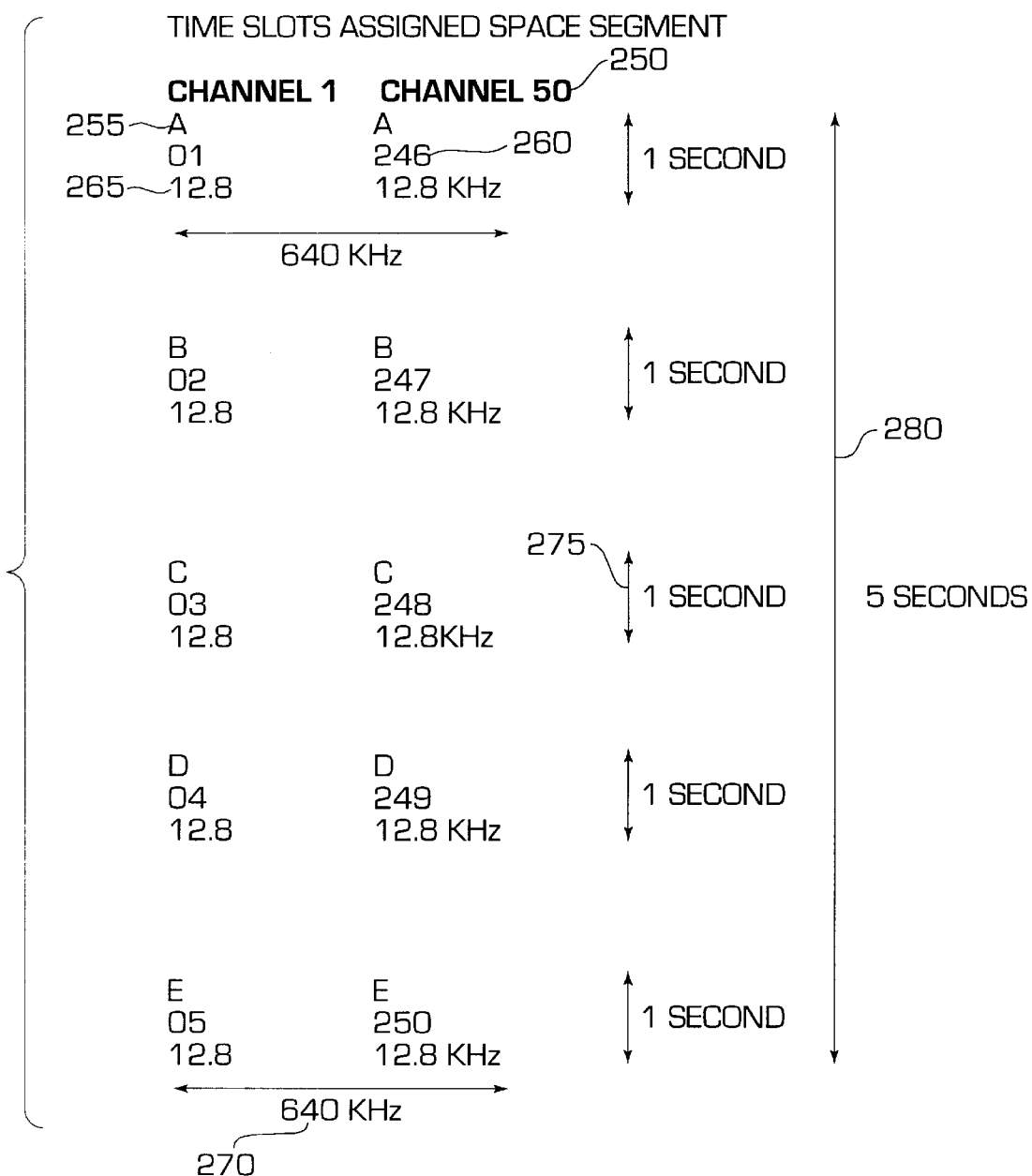
Figure 9B:
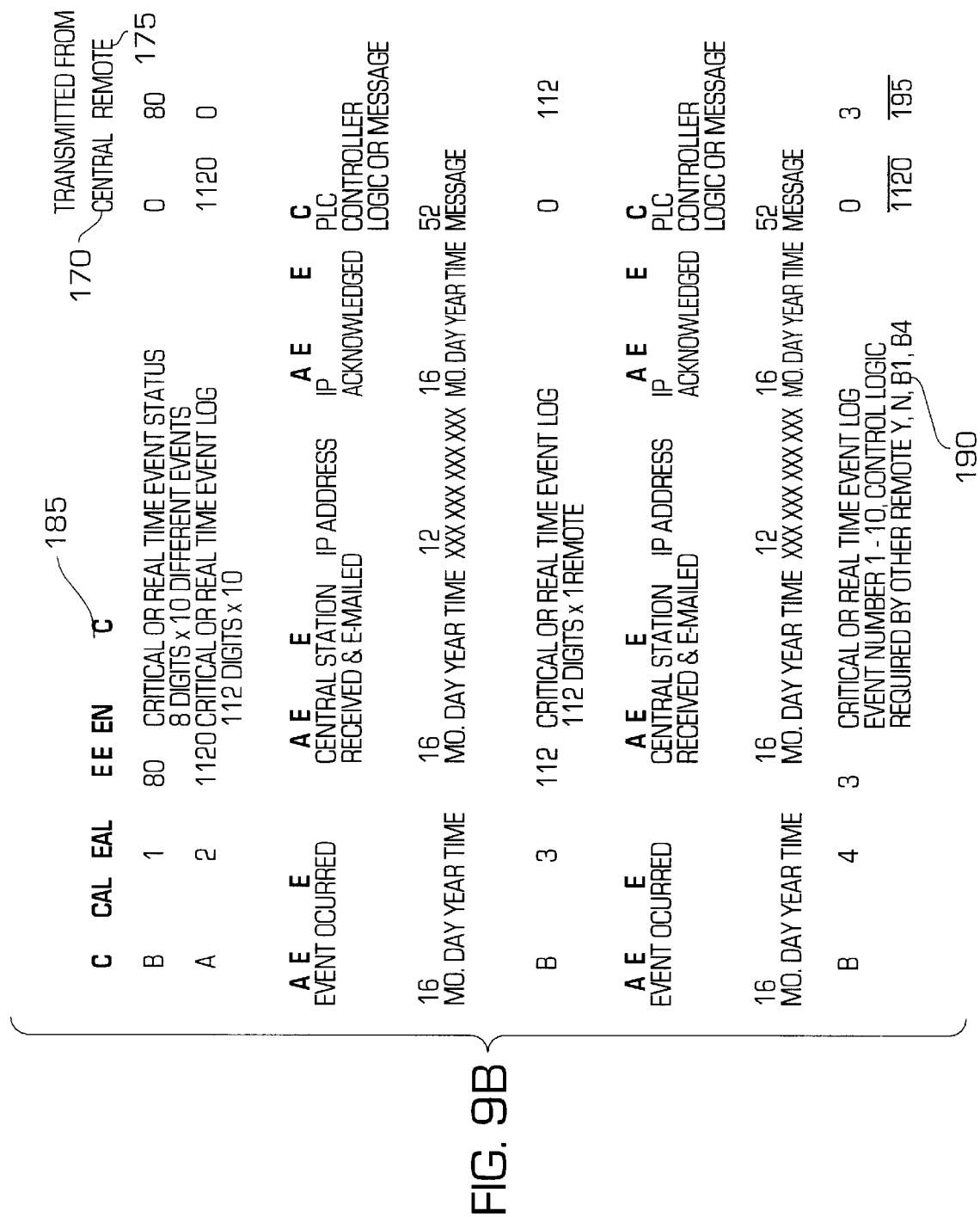
FIGS. 9A and 9E are a data schematic of operational files defining a central and remote earth station implementation of the present invention for GEO ad LEO satellites.
Figure 9E:
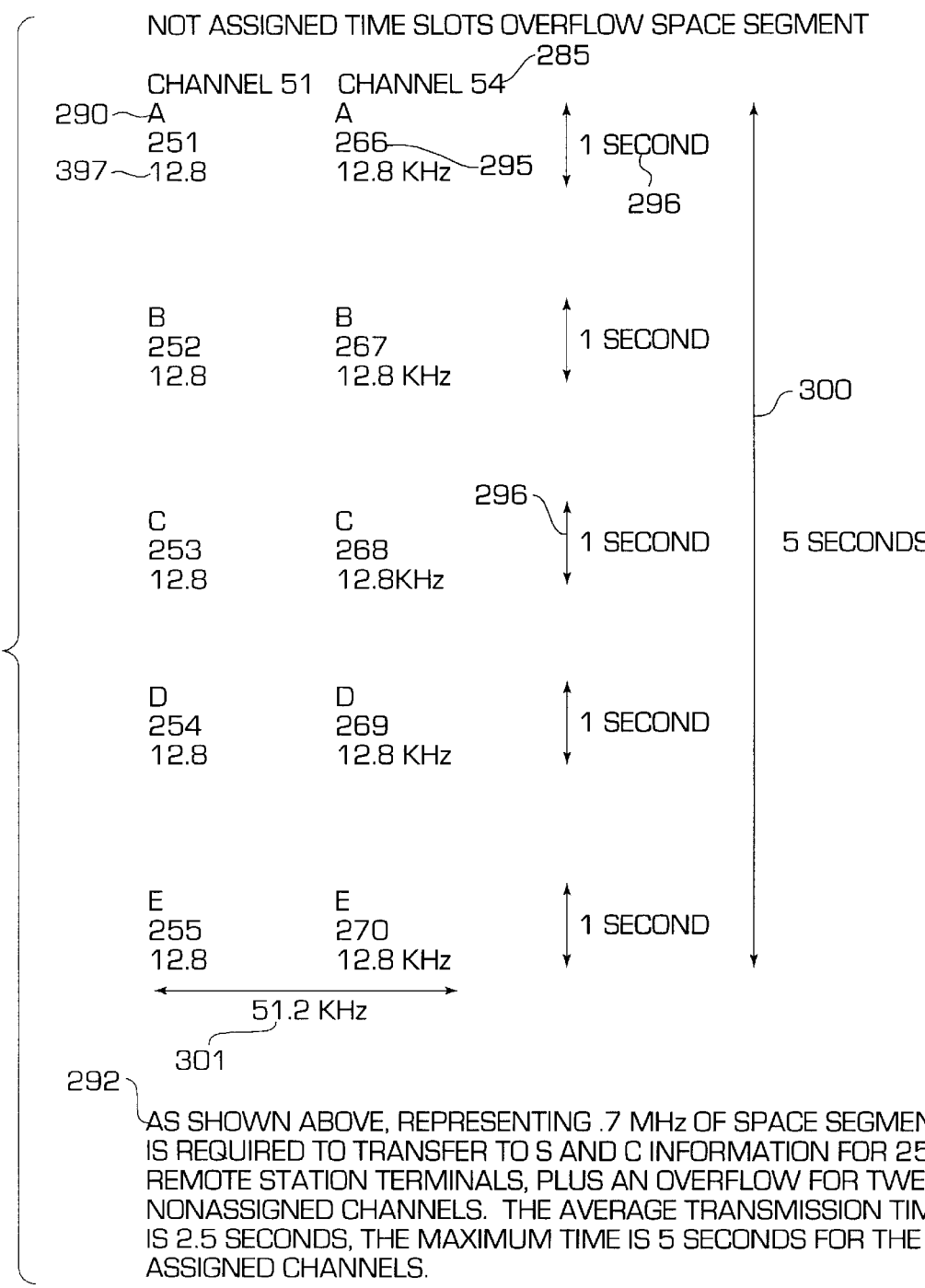

If there are no S & C time slots available for permanent allocation, then slot numbers are assigned on a temporary basis from 20 temporary slots FIGS. 8A–8B. The time slots operate in the following manner. The twenty slots are assigned on a first come, first served basis. If more than twenty time slots are needed, then the same slot number is assigned to the next twenty, however, the transmission time assignments are altered by additional time for each group of twenty slots that are assigned. Everyone gets serviced: in the implementation shown in FIG. 8, the envelope in which a S & C return path is available exceeds the five second window by an additional five seconds every time a group of twenty temporary assignments are made. In other words, more bandwidth will not be allocated, only the response time will be lengthened.

The file sizes are shown in FIGS. 9A–9E. All files are defined digits or characters. It is possible to transfer only the fields within the files that have actually changed. For simplicity the size of a file to be transferred have not been optimized. If a particular remote earth station needs a faster S & C capability then the remote could have another time slot within the five second time slot. More than two time slots may impact the ability of the second data transfer path unless the remote station is dedicated to performing S & C functions (e.g. critical or real time event status monitoring/control and reporting and not being dependent on the second data path). The S & C file is designed to recognize a problem, effect a control solution and transmit the real time or time critical event along with the control logic and what IP to effect the control or take further action. For example, if a remote earth station is located at an electric utility power distribution substation; and a critical event at this site needs to reduce or increase power consumption on a power grid leading into the electronic power distribution substation, then the need can be identified. The required change can be specified for an associated location in the electronic utility power grid. This change can be sent by a remote earth station's S & C control transmission to the central earth station and then to a corresponding Telco connection to the internet location along with a control command specifying the action required.

An example of the S & C file (FIG. 9) shows that status and control information from the remote needs to be transmitted at a rate of 9.6 KBPS . This 9.6 KBPS for a file transfer in conjunction with the propagation time from the remote earth station to the satellite and down to the central earth station and return would take about 1½ seconds (includes propagation time) for a GEO and about 1-second for a LEO.

FIG. 9 identifies an implementation approach to a detached file approach by providing a description of: remote earth station address, status codes, operation codes, required response times, data requests, data transfer types, data transfer speeds, the quality of the transfers, encrypting/scrambling needs, location, demand status, receive and transmit frequencies, authorization codes, uplink install date, uplink last maintenance date, date site entered into service, other data and messages 150. FIG. 9 also shows a central station file transfer size of 2,060 digits 230 and a remote station file transfer size of 602 digits 230. With each transport data stream from the central earth station 2,060 digits 230 will be sent to each remote earth station. Only one remote earth station site will accept and use the file information.

The above has been described with regard to designating each time slot by the time a remote earth station 6 uses a transponder as it transmits to the central earth station 4. If fixed transmission packets and times are defined, each time slot can be shortened to the length of the size of the transmission packet with each remote earth station being able to immediately follow the transmission of a preceding remote earth station. That is, one remote earth station could transmit status and control information within the fixed packet size at its respective transmission start time and a second remote earth station could immediately commence transmission of its status and control packet at its assigned start time coinciding with the end of the transmission of the packet from the first station. If a transmission has errors, there is a provision in the implementation to retransmit the packet.

An implementation of the status and control transmission path consists of applying the block diagram in FIG. 4 to an implementation of the invention to define structures, file sizes and file contents as shown in FIGS. 9A–9E. FIG. 4 of the invention establishes the logic flow that creates a status and control file 46 containing information as shown in FIGS. 9A–9E. This consists of information from transmissions and operational information S & C 150, 175 and critical real time events S & C 185, 175, and the data-second path 195, 200, 175 and 195, 210, 175, and 195, 220, 175.

In the creation of the remote file 46 inputs from critical events 74, the central file transferred to the remote 76 and session requests from terminals or workstations 70 are processed by 72. The central file transferred 76 consists of information from transmissions and operational S & C 150, 170, and critical real time events S & C 185, 170, and the data second path 195, 200, 170 and 195, 210, 170 and 195, 220, 170.

If the S & C remote file is being processed for a LEO transmission, then a special header is required 82. The information for the header is available from the central station S & C file transfer 76. After the nature of the satellite is determined, the frequency and power level are set 66 from input available from the central station S & C file transfer 76. The transfer start time 68 is set from input available from the central station S & C file transfer 76.

At a precise time as determined by 69 the file data is modulated by a BPSK modem 78 and combined with a null input from the QPSK modem and sent to the transceiver for the uplink antenna 50.

An implementation of the invention as to the precise time a remote site will transmit a status and control file is defined by FIGS. 8A–8B. FIGS. 8A–8B defines a structure for allocating time slots on a permanently assigned basis as well as a structure for handing time slots when the permanent area is totally assigned. This provision is referred to as an overflow area.

In this implementation, channels one through fifty 250 represent permanently assigned space segment. Channels fifty-one through fifty-four 285 represent an overflow area in which a remote station would be assigned on a temporary basis.

Each channel requires 12.8 KHZ 200 of space segment times fifty-four channels equals 0.7 MHZ of space segment 300.

A channel can process one remote a second 275 and if five seconds are allocated before the channel is processed a second time, then the five remotes can be processed within the 12.8 KHZ of space segment. This enables the permanently assigned channel area to accommodate 250 remote earth stations 50×5=250 and the overflow area to accommodate twenty remote earth stations 5×4=20 295.

An implementation of the remote earth stations secondary data path is described in FIG. 5. The secondary data path operates only when authorized to start a transfer 90. This authorization is contained in the central station S & C file 76, also contained in this file is the information to set the transceiver frequency 92, and the transfer end time 94.

The number of input data packets to be processed by time synchronous input data packets 96 is determined by the central station S & C file 76 (FIG. 4) as well as when to start to transfer 98. Unlike the implementation of the status and control files from a remote which only sends a fixed file at a specific predetermined reoccurring time, the secondary path is structured to continually transmit as packets are received until the transfer end time equals the GPS clock 98 or interrupted by S & C files being transferred 97. The type of data transfers, their frequency, power level, the number of workstations or terminals to be transferred, and the transfer rate are preset and pre authorized by the central station S & C file 76.

Workstations and terminals can be added or deleted via the S & C path to the central earth station. FIGS. 9A–9E Category A Item 10 can request these changes. The data line multiplexer 100 will place multiple data packets into a single data stream to be modulated by the QPSK modem 102. Both the S & C primary path and the data secondary path will use a common transceiver 86 and antenna or antennas 50.

Transmission Paths from the Central Earth Station

When the central earth station 4 receives a status and control transmission from a remote earth station 6, the central earth station 4 begins a response. It analyzes the file just received in the context of the other work it is processing for other remote earth stations, appropriately retrieves the requested information from the information resources 8, and appropriately packages and transmits the information to the respective remote earth stations through the data transmission path having the uplink 14 and the downlinks 16 as represented in FIG. 1. Transmissions over this path occur in a conventional manner. FIG. 2 indicates that such a conventional manner includes a MPEG 2, DVB, or ATSC transport data stream 18. Such a data transmission path permits synchronous data transmissions from 386 KBPS to 28 megabits per second (MBPS), an implementation of this invention is shown as 7.0 MBPS (FIG. 10) and 9.0 MBPS (FIG. 11). Various types of IP application data and (H323) protocols are indicated by the non-limiting examples designated on the attached FIGS. 6–8.

Upon receipt of a data transmission from the central station, the receiving remote station demultiplexes any combined multiplexed transmissions and routes the packet as appropriate.

Synchronization

As apparent from the foregoing, synchronization of the central earth station and all the remote earth stations 6 is important to proper functioning of the present invention. An implementation (FIGS. 6, 7) of a two-way TDMA VSAT satellite system of the present invention is synchronized by an external clock 22 that has precise timing. An example of such a precise external clock is the atomic clock of the United States Global Positioning System (GPS). This clock signal or time is received by available off the shelf equipment and is used by suitable equipment in the central earth station 4 and each of the remote earth stations 6. The external time 22 is used to synchronize the status and control transmission 58, and it is also used to synchronize the data transmissions 58.

This invention separates the usage of the TDMA principle between the status and control and the actual data transfers. TDMA specified channel of a transponder. The information data and media in this secured transfer can usually contain both compressed media and non-compressed data. In a particular implementation, for example, the information data is defined as an Internet Protocol Application (IP) and the media as H323 Protocols (H323). Thus, this approach enables one or more time slots to be dedicated for use by a remote terminal to send a status and control file on a continues cyclical basis. It also defines the data/media transmission as a second transmission path. This second transmission path delivers a compressed and non-compressed time synchronized data stream, for example.

The TDMA status and control transmission file transfers occur within a predetermined amount of time that preferably enables real-time responsiveness (e.g., in five seconds or less). An event driven real time message can be transmitted within the communication status and control transmission file. Event driven real time messages can be used for national or local security breaches, notification of terrorist attacks, fire alarms, seismic events, or any other type of real time event that requires immediate acknowledgement and action. Critical or real time events in the status and control transmission file received from a remote terminal site can be sent by the receiving ground station to the Internet. The status and control transmission file can contain programming to operate a PLC (Programmable Logic Controller) or other similar type of programmable logic control device.

Upon an acknowledgment from a central site that a critical or real time event occurred at a remote site, the remote site can begin to transmit and receive high-bandwidth transmissions (e.g., H323 compressed media video, audio & data) on a separate channel. The second transfer, or data transfer, can send packets of compressed media (H323) along with Internet Applications (IP), for example. Different protocols based on the same transport standard can be multiplexed into a single data stream and modulated. The data is then transmitted over a non-TDMA satellite channel. Upon receipt of the non-TDMA satellite transmitted data at a central site, the data is demultiplexed. The transmission from the central site is in a single multiplexed data stream and sent to all remote sites simultaneously. Upon receipt at a remote site, data packets are demultiplexed and checked for addresses. Only those packets belonging to a particular remote site and its terminals or workstations are kept. A server, a router, or other applicable type of interconnectivity equipment performs the validation of address. Thus, the satellite communication system supports instant event status, instant event messages, and communication status and communication system control as well as follow on two-way interactive compressed video/audio/data (H323) and non-compressed data transmissions (IP).

Thus, the present invention is well adapted to carry out the objects and attain the ends and advantages mentioned above as well as those inherent therein. While preferred embodiments of the invention have been described for the purpose of this disclosure, changes in the construction and arrangement of parts and the performance of steps can be made by those skilled in the art, which changes are encompassed within the spirit of this invention as defined by the appended claims.

What is claimed is:

1. A control communication method for a satellite communication system having a central earth station and a plurality of remote earth stations linked to the central earth station through at least one satellite in orbit above the earth, the method comprising:

synchronizing a timing in the central earth station and the plurality of remote earth stations such that a predetermined control time period having a plurality of distinct sequential time slots is synchronized among the central earth station and the remote earth stations;

initiating from a respective remote earth station, and completing, a transmission of control information through the satellite to the central earth station only during a respective one or more of the time slots assigned to the respective remote earth station;

receiving the transmission at the central earth station; and sending from the central earth station, in response to the received transmission, a separate transmission of data through the satellite to the remote earth station;

determining a substantially real-time response time period for the respective central earth station and remote earth stations, wherein the control time period is not longer than the substantially real-time response time period; and determining the number of time slots that can be assigned to remote earth stations for the control time period that is not longer than the determined substantially real-time response time period.

2. A method as defined in claim 1, wherein synchronizing includes receiving in the central earth station and each remote earth station a timing signal from a source other than the central earth station and the remote earth stations.

3. A method as defined in claim 1, wherein synchronizing includes receiving in the central earth station and each remote earth station a timing signal from the Global Positioning System.

4. A method as defined in claim 1, further comprising allocating the remote earth stations among a plurality of transmission frequencies when there are more remote earth stations than the number of determined time slots for the control time period, wherein an allocated frequency is used by the respective allocated remote earth stations in initiating and completing a respective transmission of control information through the satellite to the central earth station during the respective one or more of the assigned time slots of the control time period such that transmissions of control information from different remote earth stations can occur simultaneously.

5. A method as defined in claim 1, further comprising obtaining from the Internet the data to be sent from the central earth station.

6. A method as defined in claim 1, further comprising obtaining the data from an information resource containing high bandwidth digitally encoded or compressed information.

7. A method as defined in claim 6, further comprising sending from the remote earth station to the central earth station a separate transmission of high bandwidth digitally encoded or compressed information.

8. A method as defined in claim 1, further comprising sending from the remote earth station a transmission of data distinct from the control information and through a different communication channel than used for the transmission of control information.

9. A method as defined in claim 1, wherein initiating and completing a transmission of control information includes sending an alarm indication to the central earth station.

10. A method as defined in claim 9, further comprising communicating, from the central earth station, a message over the Internet in response to the alarm indication.

11. A method as defined in claim 1, further comprising detecting at a respective remote earth station a real-time event and including real-time event information in the control information.

12. A method as defined in claim 11, further comprising communicating, from the central earth station, a message over the Internet in response to the real-time event information.

13. A method of providing information to remote locations, comprising:

defining a satellite communication group having a central earth station, a plurality of remote earth stations each at a respective location remote from the central earth station, and a satellite in orbit above the earth, wherein the satellite has a predetermined communication bandwidth;

assigning a cyclical control communication time period to the defined satellite communication group, wherein the control communication time period is not longer than a substantially real-time response time period for any one of the remote earth stations in the defined satellite communication group;

determining a transmission time having a duration sufficient for a transmission to be sent from any of the remote earth stations and received by the central earth station;

allocating a specific number of time slots within the control communication time period in response to the duration of the control communication time period and the determined transmission time;

determining the number of remote earth stations in the defined satellite communication group and the number of time slots;

assigning each remote earth station to at least one respective time slot and to a common control transmission frequency if there are not more remote earth stations than time slots;

if there are more remote earth stations than time slots, assigning a remote earth station to at least one respective time slot and continuing such assigning for other remote earth stations until the time slots are all allocated and assigned a first common control transmission frequency to these assigned remote earth stations, and allocating other remote earth stations to respective time slots but at a second common control transmission frequency and repeating the same for additional remote earth stations and respective common control transmission frequencies until all the remote earth stations are assigned at least one respective time slot and common control transmission frequency;

time synchronizing the central earth station and the plurality of remote earth stations such that the cyclical control communication time period is synchronized among the central earth station and the remote earth stations;

initiating from a respective remote earth station, and completing, a transmission of control information through the satellite to the central earth station only during a respective one or more of the time slots of the cyclical control communication time period assigned to the respective remote earth station;

receiving the transmission at the central earth station; and sending from the central earth station, in response to the received transmission, a separate transmission of data through the satellite to the respective remote earth station.

14. A method as defined in claim 13, wherein the time synchronizing occurs in response to a timing signal transmitted from a source other than the central earth station and the remote earth stations.

15. A method as defined in claim 14, further comprising obtaining from the Internet the data to be sent from the central earth station.

16. A method as defined in claim 14, further comprising obtaining data, for sending from the central earth station, from an information resource containing high bandwidth information.

17. A method as defined in claim 13, wherein the time synchronizing occurs in response to a timing signal transmitted to each of the central earth station and the remote earth stations from the Global Positioning System.

18. A method as defined in claim 17, further comprising obtaining from the Internet the data to be sent from the central earth station.

19. A method as defined in claim 17, further comprising obtaining the data from an information resource containing high bandwidth information.

20. A method as defined in claim 13, further comprising obtaining from the Internet data to be sent from the central earth station.

21. A method as defined in claim 13, further comprising obtaining the data from an information resource containing high bandwidth information.

22. A method as defined in claim 21, further comprising sending from a respective one of the remote earth stations to the central earth station a separate transmission of high bandwidth information.

23. A method as defined in claim 13, further comprising sending from a respective remote earth station a transmission of data distinct from the transmission of control information and through a different communication channel than used for the transmission of control information.

24. A method as defined in claim 13, wherein initiating and completing a transmission of control information includes sending an alarm indication to the central earth station.

25. A method as defined in claim 24, further comprising communicating, from the central earth station, a message over the Internet in response to the alarm indication.

26. A method as defined in claim 13, further comprising detecting at a respective remote earth station a real-time event and including real-time event information in the control information.

27. A method as defined in claim 26, further comprising communicating, from the central earth station, a message over the Internet in response to the real-time event information.

28. A satellite communication system as defined in claim 16, wherein the information resource includes the Internet.

* * * * *